(12) United States Patent
Welle (10) Patent No.: US 8,380,449 B2
(45) Date of Patent: Feb. 19, 2013

(54) SEGMENT-BASED SIGNAL PROCESSING

(75) Inventor: Roland Welle, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 303 days.

(21) Appl. No.: 12/883,690

(22) Filed: Sep. 16, 2010

(65) Prior Publication Data

US 2011/0231118 A1    Sep. 22, 2011

Related U.S. Application Data

(60) Provisional application No. 61/250,958, filed on Oct. 13, 2009.

(30) Foreign Application Priority Data

Oct. 12, 2009 (EP) ...................................... 09172769

(51) Int. Cl.
    *G06F 7/00* (2006.01)
(52) U.S. Cl. ........................................................ 702/55
(58) Field of Classification Search .................... 702/55, 702/182–185
    See application file for complete search history.

(56) References Cited

U.S. PATENT DOCUMENTS

| 5,587,969 A | 12/1996 | Kroemer et al. |
| 6,014,100 A | 1/2000 | Fehrenbach et al. |
| 7,284,425 B2 | 10/2007 | Wennerberg et al. |
| 2004/0257269 A1 | 12/2004 | Laun et al. |
| 2006/0137446 A1 | 6/2006 | Wennerberg et al. |
| 2008/0275923 A1* | 11/2008 | Haselton et al. ............. 707/204 |

FOREIGN PATENT DOCUMENTS

| DE | 42 34 300 | 4/1994 |
| EP | 1 628 119 | 2/2006 |
| EP | 2 148 219 | 1/2010 |
| WO | 2004/010093 | 1/2004 |
| WO | 2009/037000 | 3/2009 |

OTHER PUBLICATIONS

Leung et al., "Evaluation of Multiple Radar Target Trackers in Stressful Environments", IEEE Transactions on Aerospace and Electronic Systems, vol. 35, No. 2, Apr. 1999, pp. 663-674.

\* cited by examiner

*Primary Examiner* — Edward Raymond (74) *Attorney, Agent, or Firm* — Fay Kaplun & Marcin, LLP (57) ABSTRACT

An electronics module for a filling-level measuring device is stated which evaluates a newly acquired data point on the basis of an expectation funnel and, if this data point is situated within the expectation funnel, replaces a preceding data point by this newly acquired data point. Otherwise a new expectation funnel is generated. As a result of this the presentation of echo signal waveforms can be created in a more efficient manner.

13 Claims, 10 Drawing Sheets

| ID | Echo start/m | Echo position/m | Echo end/m |
|----|--------------|-----------------|------------|
| E0 | 2.00 | 2.50 | 3.00 |
| E1 | 4.50 | 5.00 | 5.50 |

| ID | Point in time | Echo start/m | Echo position/m | Echo end/m |
|---|---|---|---|---|
| T0 | 10:00 | 2.00 | 2.50 | 3.00 |
|  | 10:05 | 2.00 | 2.50 | 3.00 |
|  | 10:10 | 2.00 | 2.50 | 3.00 |
| T1 | 10:00 | 3.00 | 3.50 | 4.00 |
|  | 10:05 | 4.50 | 5.00 | 5.50 |
|  | 10:10 | 6.00 | 6.50 | 7.00 |

SEGMENT-BASED SIGNAL PROCESSING

REFERENCE TO RELATED APPLICATIONS

The present application claims the benefit of the filing date of EP Patent Application Serial No. EP 09 172 769.3 filed 12 Oct. 2009, the disclosure of which is hereby incorporated herein by reference and U.S. Provisional Patent Application Ser. No. 61/250,958 filed 13 Oct. 2009 the disclosure of which is hereby incorporated by reference.

FIELD OF THE INVENTION

The invention relates to the field of filling level measuring. In particular, the invention relates to an electronics module for a filling level measuring device, to a filling level measuring device comprising such an electronics module, to a method for segment-based signal processing in filling level measuring to a program element and to a computer-readable medium.

TECHNOLOGICAL BACKGROUND

In present-day measuring methods for measuring filling levels, pressures or flows through a conduit, the measured values, if necessary following corresponding processing, can be stored in the form of so-called track lists.

In the case of filling level measuring that is, for example, based on the so-called frequency modulated continuous wave (FMCW) principle or the pulse transit-time method, these track lists correspond to measured echo curves. In the case of pressure measuring these track lists can, for example, reflect the chronological progress of the measured pressures, while in the case of flow measuring, they can reflect a flow rate at predetermined points in time.

These track lists often require a relatively large amount of storage space. Transmitting the track lists from the measuring device to an external unit is only possible if adequate transmission capacity is available.

U.S. Pat. No. 7,284,425 B2 describes a method for filling level determination in which a differentiation can be made between moving surfaces and stationary surfaces.

WO 2004/010093 A1 describes a method for determining an expectation range relating to future echoes, in which expectation range the chronological behaviour of echo data from the past is taken into account.

DE 4234300 C2 describes a measuring method according to the pulse transit-time method.

WO 2009/037000 A3 describes a method for finding and extracting echoes.

SUMMARY OF THE INVENTION

According to an exemplary embodiment of the invention, an electronics module for a filling-level measuring device, for a pressure measuring device and/or for a flow measuring device is stated, which electronics module can carry out segment-based signal processing. The electronics module comprises a storage unit for storing a chronological sequence of data points that correspond to the measured values acquired by the measuring device. Furthermore, an arithmetic unit which is programmed for the targeted deletion of individual data points from the storage device is provided, wherein the arithmetic unit is furthermore designed for calculating the presentation of the chronological progress of the filling level, the pressure and/or the flow on the basis of the data points that remain in the storage device after targeted deletion. After every new measuring cycle of the measuring device, a decision is made (for example by the arithmetic unit) as to whether or not the last-stored data point is to be replaced by a new data point generated in the new measuring cycle or not.

In this way it may be possible to keep the storage space requirements constant under certain circumstances, which are explained in more detail below, because in each case the last-stored measured value is replaced by the new measured value.

In other words the chronological progress of the filling level is calculated and thus reconstructed from a small number of data points. Always only two data points from the data points which remain in the storage device after targeted deletion of single data points are used for creating a first line segment which characterizes a time interval during which the filling level is constant or has a constant rate of change (the first derivative being constant). If a further data point is added to the storage device, a new, second line segment is created which from this time on characterizes the timely evolution of the filling level. This second line segment corresponds to a second rate of change of the filling level and thus has another mathematical description (e.g. another first derivative) as the first line segment.

According to a further exemplary embodiment of the invention, presentation of the chronological progress of the filling level, the pressure or the flow takes place by means of stringing together straight-line segments or other curve segments, for example polynomial functions. In this process the straight-line segments or curve segments are in each case characterised by way of two data points stored in the storage device. These two data points are, for example, the first measured value and the last measured value, with the latter having replaced the preceding measured value.

According to a further exemplary embodiment of the invention, each data point corresponds to a measured echo. In other words, the electronics module is an electronics module that can be used for filling level measuring according to the FMCW principle or the pulse transit-time method.

According to a further exemplary embodiment of the invention, the chronological sequence of the data points comprises one or several tracks that are stored as track lists.

According to a further exemplary embodiment of the invention, the measuring device is a filling-level measuring device that operates according to the pulse transit-time method or the FMCW method, wherein the electronics module is designed to identify a filling level echo.

According to a further exemplary embodiment of the invention, the arithmetic unit is designed to calculate an expectation funnel of corresponding data points of the chronological sequence of data points, wherein if a data point, which has been newly generated by a reading, of a newly acquired echo is situated within the expectation funnel, this data point is stored and at the same time replaces an earlier data point.

For example, after each measuring cycle a determination is made as to whether or not the new data point (for example the measured filling level at a corresponding point in time) is situated in the corresponding expectation funnel. If this is the case this new data point replaces the preceding one.

It should be noted that the term "expectation funnel" relates to an area in a filling level versus measurement time diagram between two curves which characterize the boundaries of the so called expectation funnel. Those curves do not necessarily have to be straight lines but may have another shape which makes them fit for characterizing the area in which future filling levels are expected if no change of the present trend takes place.

According to a further exemplary embodiment of the invention, a data point, which has been newly generated by a reading, of a newly acquired echo is stored if this data point is situated outside the expectation region. However, it does not at the same time replace an earlier data point.

According to a further exemplary embodiment of the invention, the arithmetic unit is designed to calculate a further expectation funnel by means of the newly generated and stored data point.

If it thus turns out that the data point generated in the new measuring cycle is situated outside the expectation funnel, this data point is additionally entered into the storage device (in other words, for example, in the corresponding track list) and a new expectation funnel can be generated. This leads to the trend of the resulting measuring curve changing, and, if the measuring curve is represented by straight-line segments, to a new straight-line segment to be added that comprises a gradient that differs from that of the previous straight-line segment.

According to a further exemplary embodiment of the invention, a measuring device is stated which can, for example, be used for filling level measuring, pressure measuring and/or flow measuring and that comprises an electronics module described in the preceding and in the following text.

According to a further exemplary embodiment of the invention, a method for segment-based signal processing in filling level measuring, pressure measuring and/or flow measuring is stated. In the case of filling level measuring the method relates, for example, to echo signal processing. In the method a chronological sequence of data points that correspond to the measured values acquired by the measuring device is stored. After each new measuring cycle of the measuring device a decision is made as to whether the last-stored data point is to be replaced by a data point generated in the new measuring cycle or not (and if this replacement is to take place the data point is in fact replaced). Furthermore, calculation of a presentation of the chronological progress of the filling level, the pressure and/or the flow takes place on the basis of the data points stored in the storage device after replacement, i.e. targeted deletion (or otherwise addition) of the last-stored data point.

According to a further exemplary embodiment of the invention, an expectation funnel of corresponding data points of the chronological sequence of data points is calculated. If a data point, which has been newly generated by a new reading, of a newly acquired echo is situated within the expectation funnel, this data point is stored and at the same time replaces an earlier data point. If the data point, which has been newly generated by the new reading, of the newly acquired echo is situated outside the expectation funnel, this data point is stored in addition to the existing data points (it thus does not at the same time replace an earlier data point).

According to a further exemplary embodiment of the invention, a program element is stated which when executed on a processor of a measuring device instructs the processor and thus the measuring device to carry out the steps described in the preceding and in the following text.

According to a further exemplary embodiment of the invention, a computer-readable medium is stated on which a program element is stored which when executed on a processor of a measuring device instructs the processor and thus the measuring device to carry out the steps described in the preceding and in the following text.

The exemplary embodiments described equally relate to the electronics module, the measuring device, the method, the program element and the computer-readable medium. In other words, the characteristics described in the preceding and in the following text in an exemplary manner in relation to the electronics module can also be implemented as process-related steps and vice versa.

Below, exemplary embodiments of the invention are described with reference to the figures.

DETAILED DESCRIPTION OF EXEMPLARY EMBODIMENTS

The illustrations in the figures are diagrammatic and not to scale.

In the following description of the figures the same reference characters are used for identical or similar elements.

The present invention relates to methods and devices for measuring all kinds of filling levels, pressures or flows. In filling level sensors that operate according to the FMCW method or the pulse transit-time method, electromagnetic or acoustic waves are emitted in the direction of a filling level surface. Subsequently, the sensor records the echo signals reflected by the feed material and the container internals, and from them derives the respective filling level.

Figure 1:
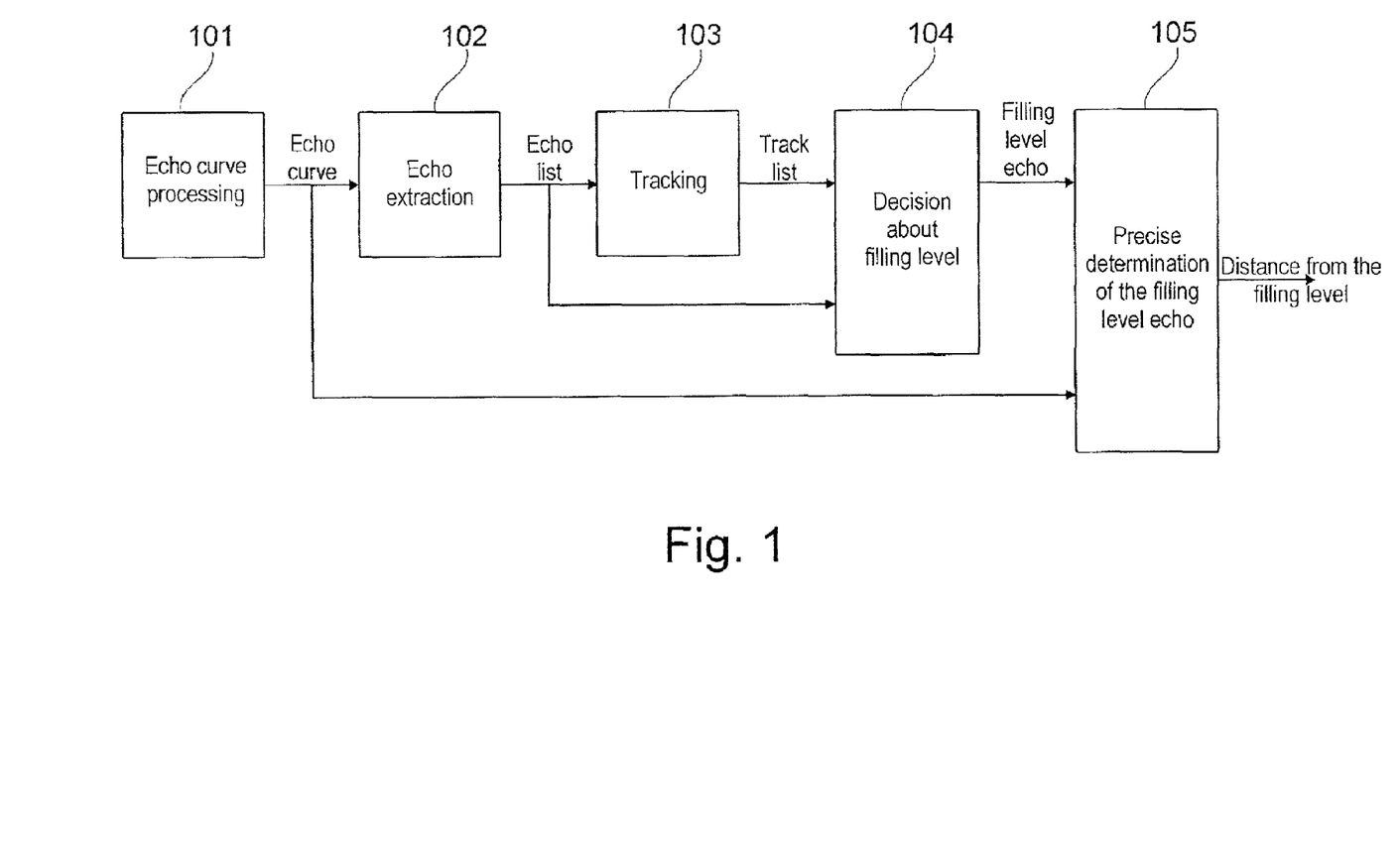
FIG. 1 shows the principle approach in echo signal processing.

FIG. 1 shows the basic flow of echo signal processing within a commercial filling-level measuring device.

The block "Echo curve processing" 101 comprises all the hardware units and software units that are required to provide an echo curve as an image of the current reflection conditions within a container. The echo curve is preferably acquired in digital form within a microprocessor system and is investigated, with the use of known methods, for any echoes contained therein.

The methods applied for this purpose within the block "Echo extraction" 102 comprise, in particular, methods from the field of threshold-value-based echo extraction or methods based on scale-based echo extraction. After processing the echo extraction method a digital echo list is provided which preferably comprises details relating to the start, location and end of one or several echoes contained in the echo curve.

In order to further increase the reliability of echo signal processing of a filling-level measuring device, the found echoes are placed within a historic context within the block "Tracking" 103. The methods used in this process are derived from the current state of the art. For example, methods based on the Munkres algorithm can be used to advantage. Within tracking, in particular, the progress of the location of an echo is tracked over several individual readings, and this collected information is represented in the storage device in the form of a track. The collected history information of several echoes is made available externally in the form of a track list.

In the block "Decision about filling level" 104 the data of the current echo list and the information relating to the chronological progress of individual echoes are balanced in order to make it possible, according to known methods, to identify the echo pertaining to the filling level.

In order to further improve the accuracy of filling level measuring, the position of the determined filling level echo can be determined with great accuracy by means of the optional block "Precise measuring of the filling level echo" 105 with the use of computing-time-intensive methods, for example interpolation methods. The determined distance from the feed material is made available externally. This provision can be implemented in analogue form (e.g. by way of a 4.20 mA interface) or in digital form (e.g. by way of a field bus).

Figure 2:
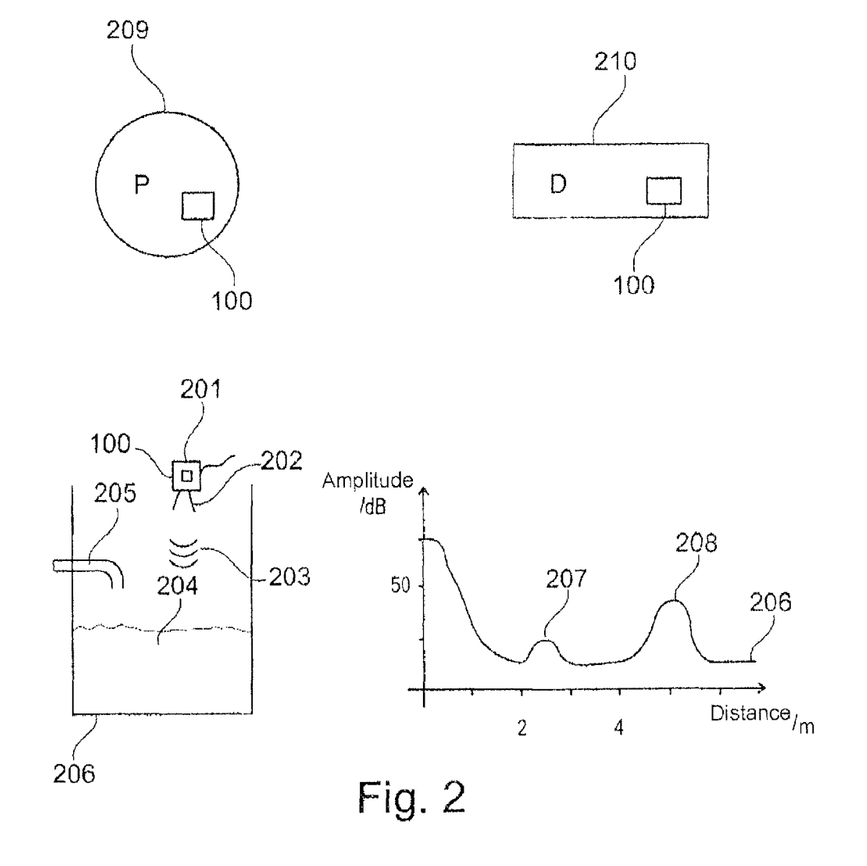
FIG. 2 shows a filling-level measuring device, a pressure measuring device and a flow measuring device according to an exemplary embodiment of the invention.

The advantages of the present invention result from the special boundary conditions to which echo signal processing is subjected within a commercial filling-level measuring device. FIG. 2 shows a typical application of a filling-level measuring device 201 with an electronics module 100 according to an exemplary embodiment of the invention. Also shown are a pressure measuring device 209 with an electronics module 100 and a flow measuring device 210 with an electronics module.

By way of the antenna 202 the filling-level measuring device 201 radiates a signal 203 in the direction of the medium 204 to be measured. The filling-level measuring device itself can determine the distance from the medium according to the ultrasound principle, the radar principle, the laser principle, or the principle of the guided microwave.

Accordingly, both ultrasonic waves and electromagnetic waves can be considered as signals. The medium 204 reflects the impinging wave back to the measuring device where said wave is received and processed. At the same time the radiated signal is also reflected by container internals, for example by a supply pipe 205. The echo curve 206 received in the filling-level measuring device 201 can thus contain not only the useful echo 208 caused by the filling level, but also echoes caused by inbuilt fixed interference positions 207, which echoes are hereinafter referred to as spurious echoes.

Within the then starting signal processing procedure, the echo curve is investigated in a targeted manner for echoes 102.

Figure 3:
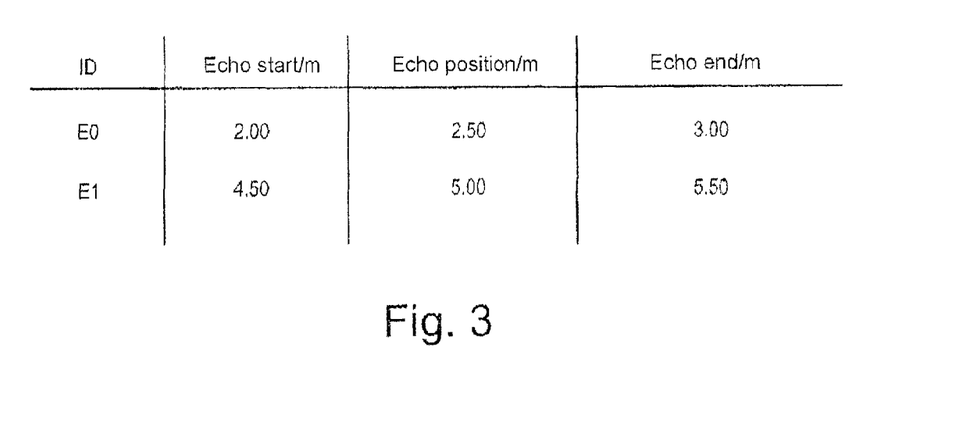
FIG. 3 shows an echo list.

As a result of echo extraction, an echo list according to the diagram of FIG. 3 is generated. Apart from the characteristic values of the spurious echo (E0, 207) generated by the supply pipe, the echo list also contains the filling level echo (E1, 208) generated by the medium (204).

Of course, the presented characteristics of the echo list merely represent special implementation of an echo list. In practical application echo lists with further characteristics or changed characteristics of an echo are also commonly used.

Figure 4:
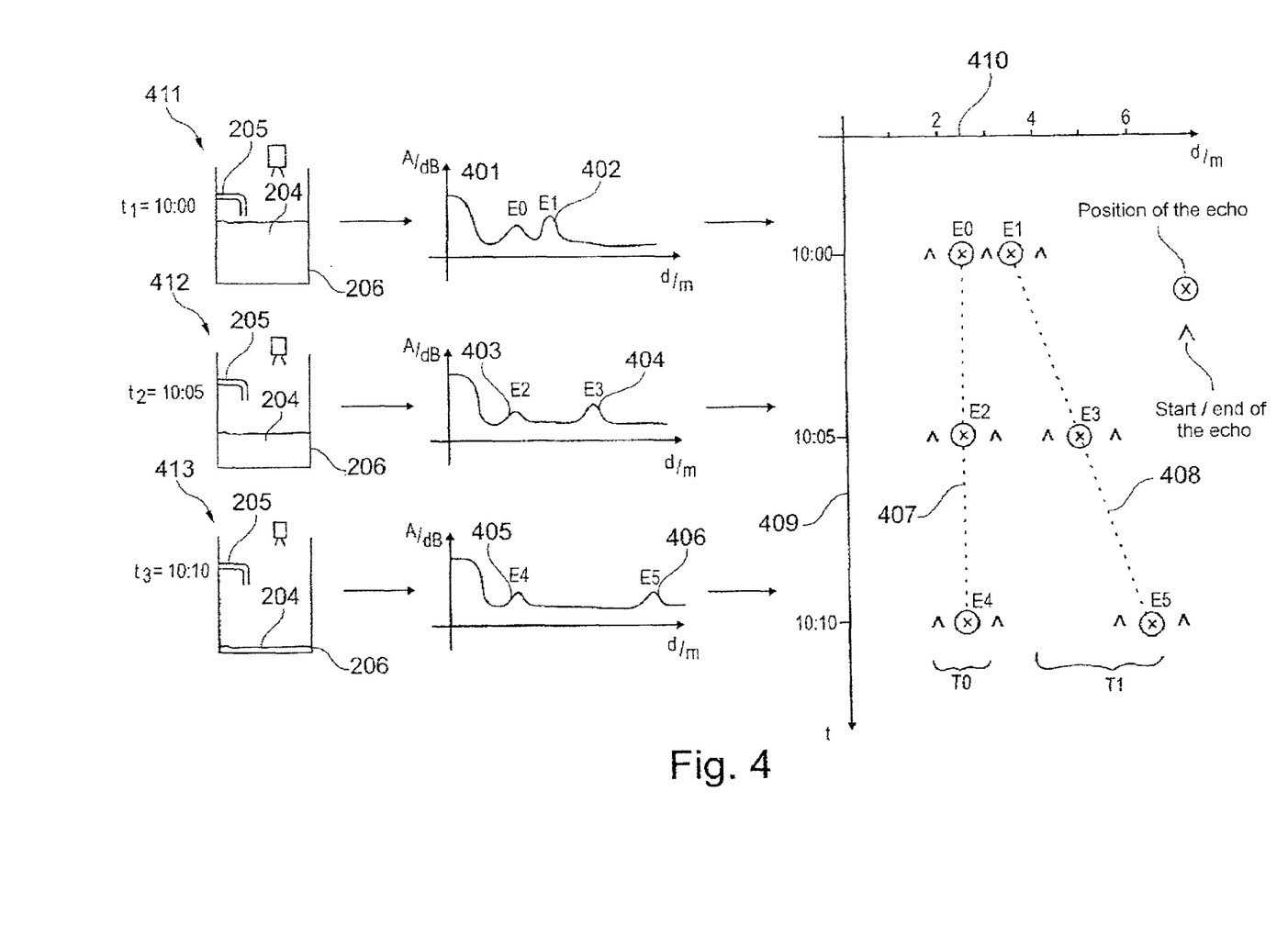
FIG. 4 shows the repetition of measuring cycles.

If cyclical measuring cycles are implemented in a filling-level measuring device, then this results in a sequence of received echo curves as shown in FIG. 4. As an example three independent measuring cycles 411, 412, 413 in each case spaced apart by five minutes are shown. Of course, significantly faster measuring cycles, for example spaced apart by one second, can be implemented instead.

The scenario described shows the conditions during the emptying of a container 206. In order to keep track of the progress of the individual echoes over several such measuring cycles, specialised algorithms are used, which are known by the term "tracking". In the present example the progress of the echoes 401 (E0), 403 (E2) and 405 (E4), which are caused by the interference position 205, are described by means of a common track 407 (T0). Accordingly, the progress of the echoes 402 (E1), 404 (E3) and 406 (E5), which are generated by the medium 204, is represented by a common track 408 (T1). The presentation, in the form of a track, the progress of echoes that are caused by a common reflection position is described in the literature and is used to advantage also in other fields, for example in air surveillance.

The vertical axis 410 represents the distance from the feed material surface or from the interference position in metres, while the longitudinal axis 409 represents the time at which the respective measuring cycle takes place.

Figure 5:
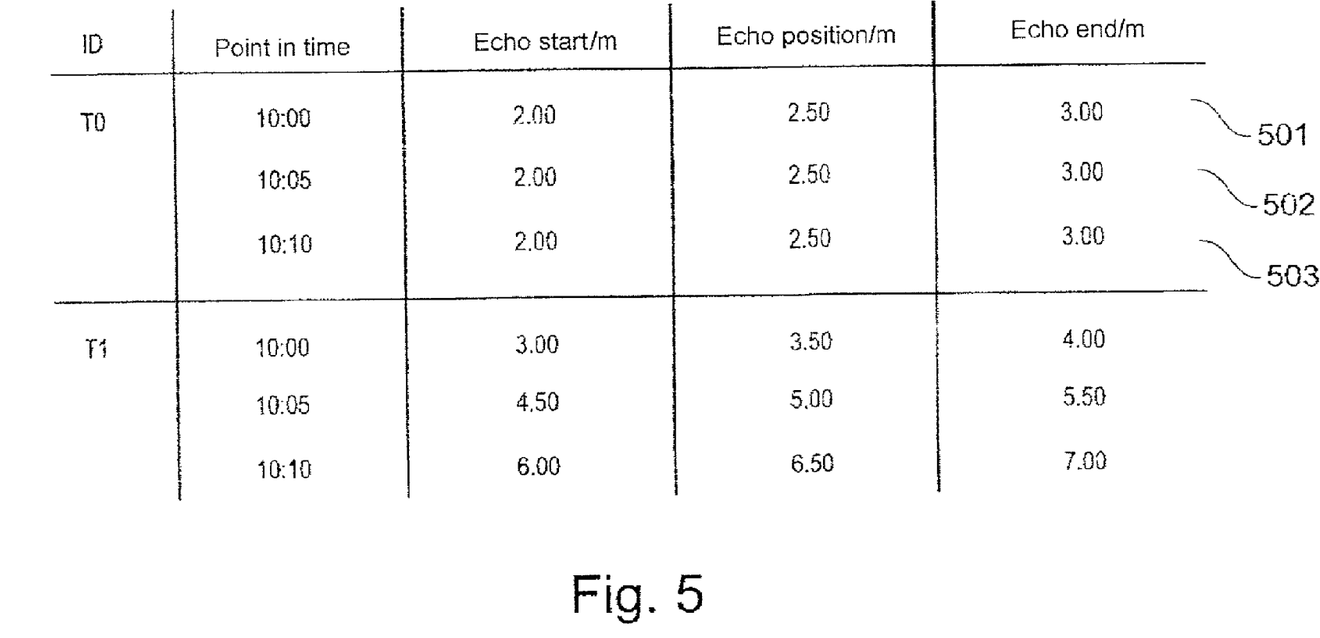
FIG. 5 shows two tracks within a track list.

On completion of tracking 103 the found tracks are provided in the form of a track list. FIG. 5 shows in an exemplary manner a track list as would result from the above-mentioned sequence of echo curves. It should again be pointed out that the presented parameters of the track list represent an advantageous selection of possible characteristics of the underlying echoes. Of course, it is also possible to track additional or changed characteristics within such a track list.

With reference to the track list shown it becomes immediately evident that with each newly carried-out measuring cycle at least one new set of new echo data needs to be inserted in the already existing track list. Since within a commercial filling-level measuring device both storage space and computing time are limited resources, this non-compressed presentation of the progress of individual echoes represents a considerable load on the storage device within a filling-level measuring device. For this reason in practical applications only very short periods of time can be monitored by means of tracking algorithms. Furthermore, with reference to the table of FIG. 5 it becomes clear that the approach used is not well adapted to the special requirements in the context of filling level measuring. For example, tracking spurious echoes (E0, E2, E4) requires just as many storage locations as does tracking filling level echoes, although the entries of the spurious echoes 501, 502, 503, due to their typical stationarity, contain almost no additional information.

It is thus among other things the object of the invention to implement, within a commercial filling-level measuring device, an efficient, storage-device-optimised presentation of echo signal progress under the boundary condition of limited storage device resources and computing time resources.

Figure 11:
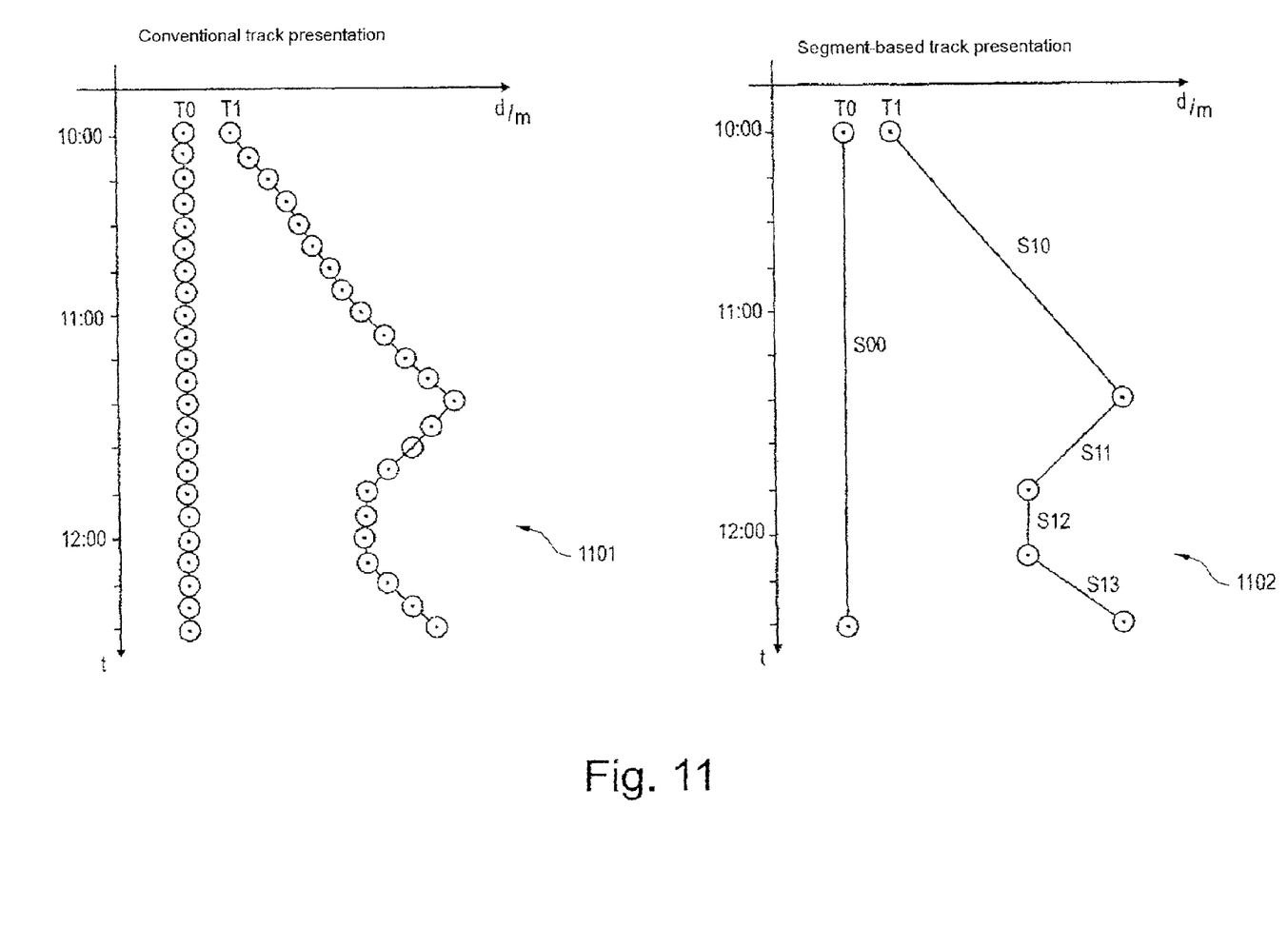
FIG. 11 shows a comparison of the results of a first method with the results of the method according to an exemplary embodiment of the invention.

FIG. 11 illustrates the basic idea of the method. While presentation 1101 of tracks in the storage device requires a multitude of individual supporting points in relation to the progress of one or several tracks, the method according to the invention attempts to implement a significantly reduced image 1102 of the tracks in the storage device.

In the present case an attempt is made to describe the progress of the location of an echo over several readings by stringing together straight-line segments that are characterised by the respective starting point and end point. Of course, it is also possible to analyse other characteristic values, for example the amplitude values of the respective echoes, for linear progress in order to, based on this analysis, calculate a storage-device-efficient presentation.

Figure 9:
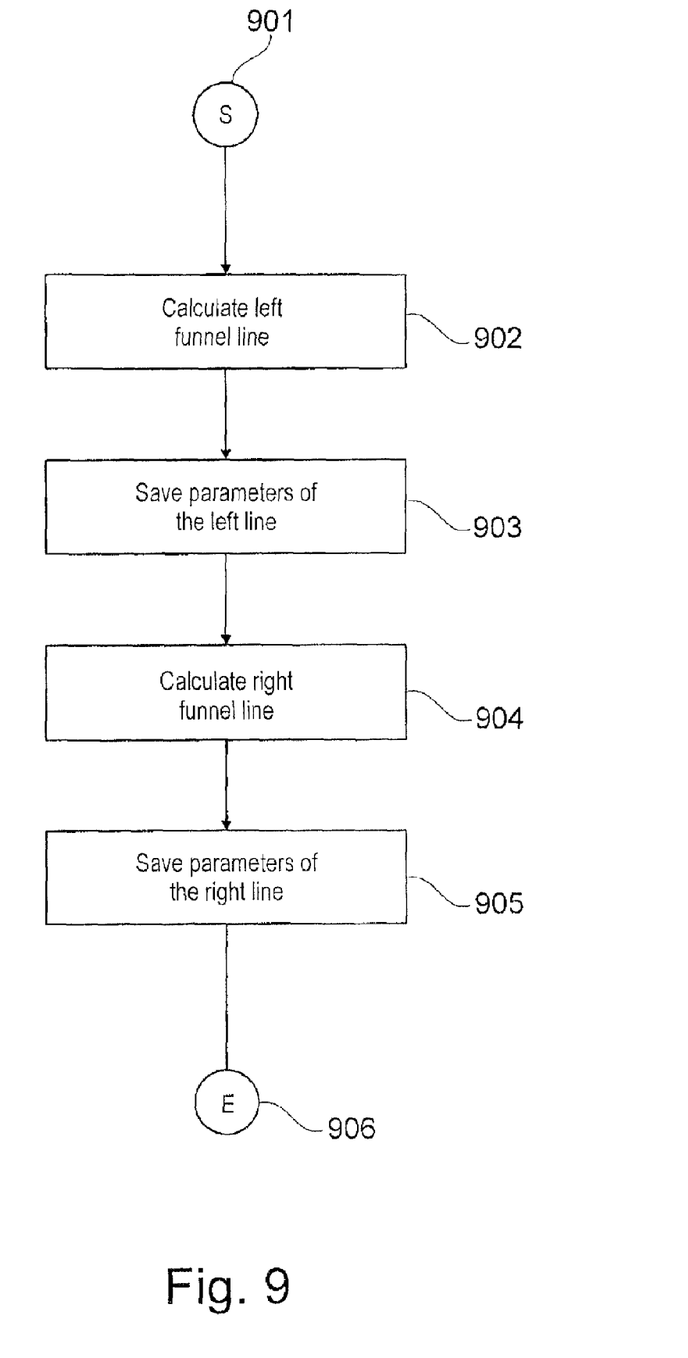
FIG. 9 shows a flow chart for initialising an expectation funnel.
Figure 10:
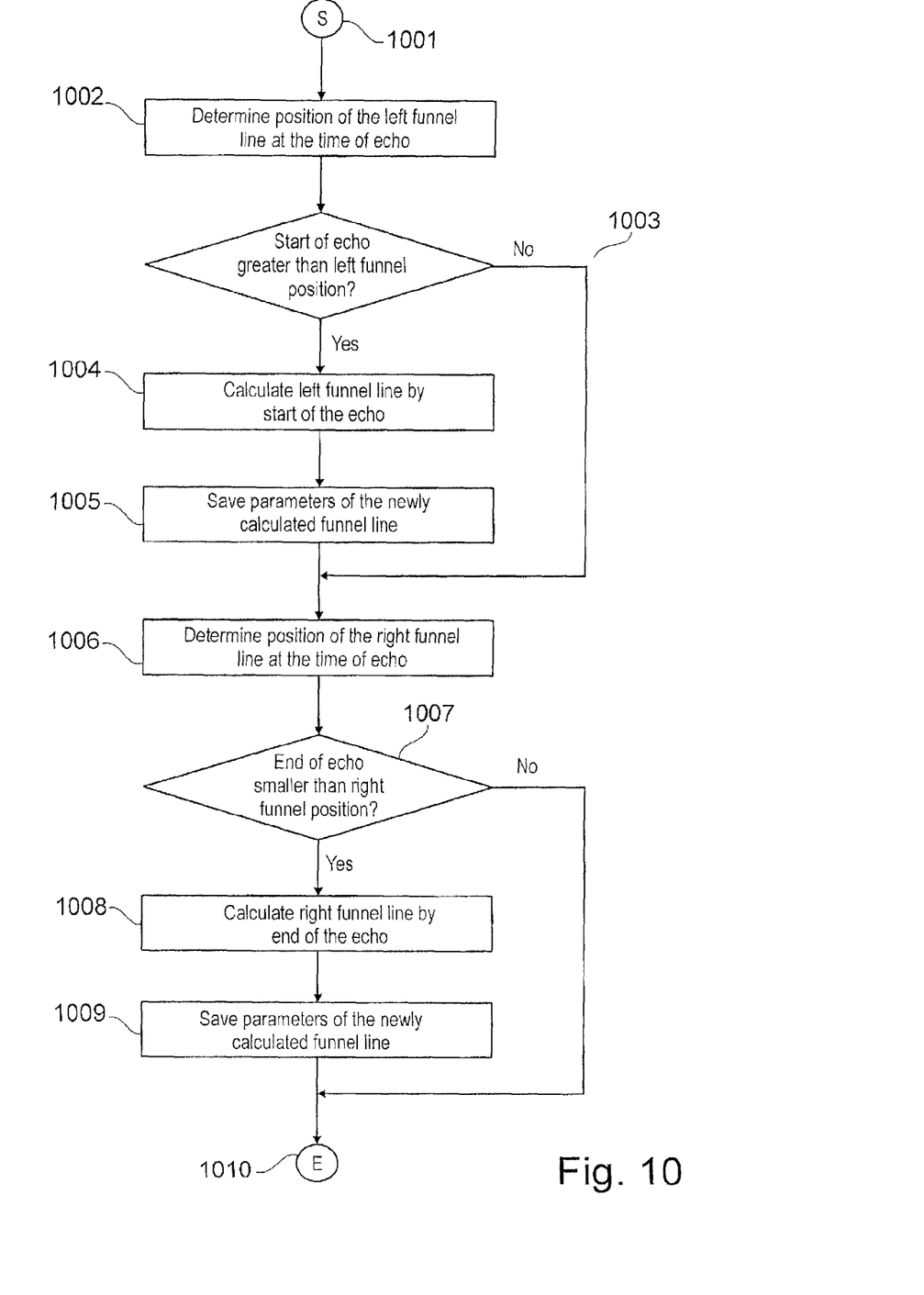
FIG. 10 shows a flow chart for updating an expectation funnel.

Below, processing of the method according to the invention is explained in detail with reference to an example (FIG. 6, FIG. 7) in conjunction with the flow charts of FIGS. 8 to 10.

In step 800 the method is started anew in relation to each track during initialisation, i.e. during the first takeover of the data of an echo to a new track of the track list, as well as when new echoes are added to an already existing track. In step 801*a* check is made as to whether the track is initialised anew when the data of the transferred echo is entered. If this is the case, then in step 802 the relevant data of the echo is directly taken over into the track list.

Figure 6:
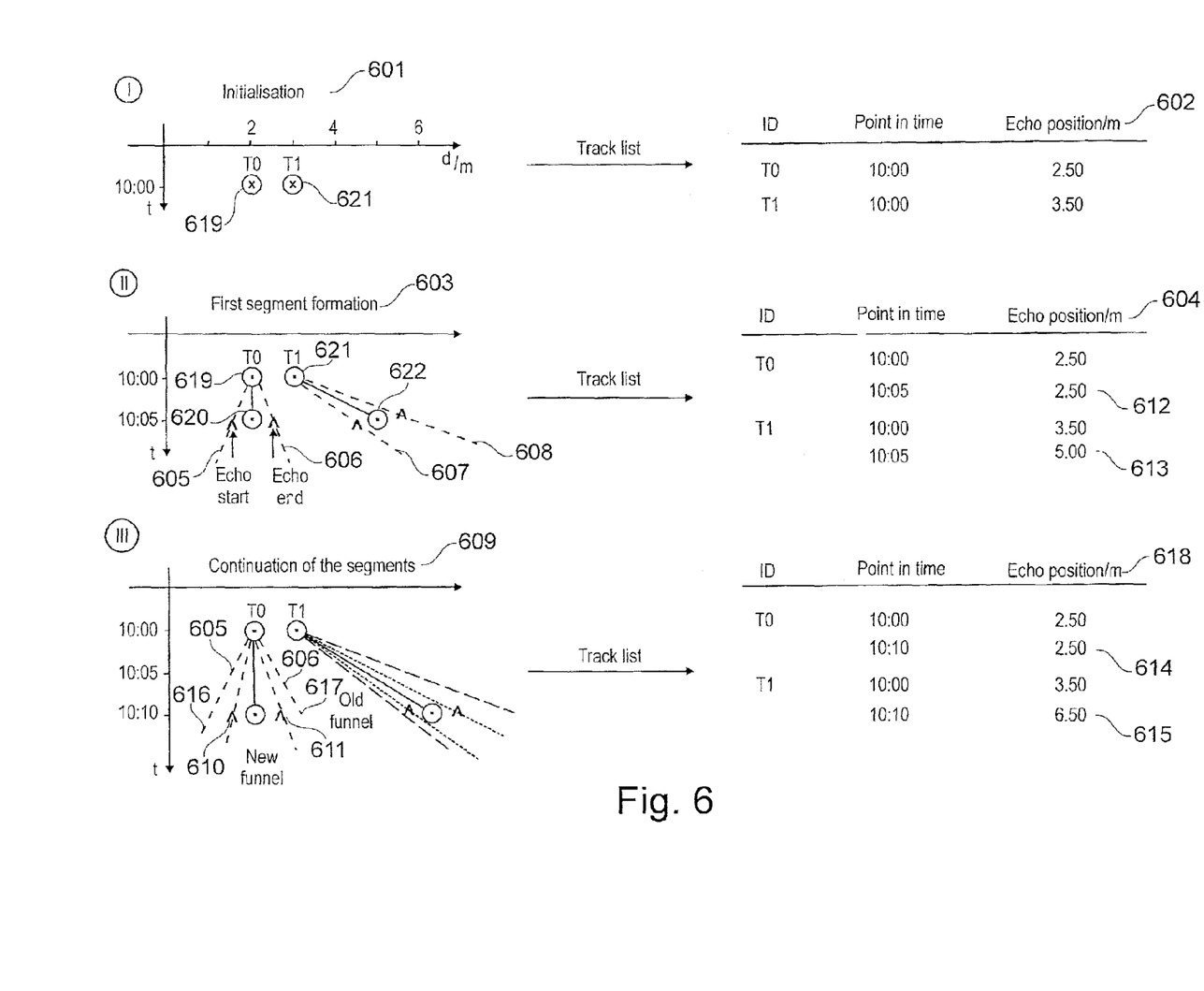
FIG. 6 shows sequences for implementing a first part of a method according to an exemplary embodiment of the invention.

FIG. 6 shows the practical implementation of the steps explained. In step 601 initialisation takes place. The two echoes 619 (E0) (207 in FIG. 2 or 401 in FIG. 4) and 621 (E1) (208 in FIG. 2 or 402 in FIG. 4) are entered anew into the tracklist 602 during tracking. In the present example only the position and the point in time of the occurrence of the respective echo within a track are recorded.

In the next measuring cycle 603 the echo 403, 620 (E2) is allocated to track T0, and the echo 404, 622 (E3) is allocated to track T1. Since the tracks are already initialised, in step 810 the echo data is directly taken over into the track list. The expanded track list 604 now comprises two entries for each track. Furthermore, in step 900 the boundary lines 605, 606, 607, 608 of the expectation funnels are initialised anew. In step 902 the straight-line equations of the left funnel straight line 605, 607 are calculated. The left funnel straight line is defined by the position of the start of the current track segment and the position of the start of the last-added echo.

In step 903 the parameters of the straight-line equation (gradient m, offset b) of the left funnel straight line are stored in the storage device of the sensor. In step 904 the straight-line equations of the right funnel straight line 606, 608 are calculated. The right funnel straight line of a track results from the position of the start of the current track segment and the position of the end of the last-added echo. The parameters of the right funnel straight line are also stored in the storage device 905.

After a new measuring cycle 609 has been triggered, the echo extraction algorithm 102 identifies the two echoes E4 (405) and E5 (406), wherein, within the tracking procedure, echo E4 is to be allocated to track T0, and echo E5 is to be allocated to track T1.

At this stage the method flows into step 804. With reference to the parameters, deposited in step 900, of the left funnel straight line 605 it is then possible to determine the position of the left funnel rim at the point in time of the occurrence of the echoes E4 (405) and E5 (406). In step 805 a check is made as to whether the position of the echo 405 that is newly to be adjoined is smaller than the calculated position 616 of the left funnel rim at the corresponding point in time. If this is the case, continuation is with step 810, i.e. a new track segment is started. If this is not the case, in steps 806 and 807 an investigation takes place as to whether the position of the echo is greater than the position 617 of the calculated right funnel rim at the point in time of the occurrence of the echo.

If this is the case, continuation is with step 810, i.e. a new track segment is started.

If the position of the echo that is to be acquired anew is within the region of the extended funnel of the respective track, in step 808 the last line 612 of the respective track is deleted. In this case it is precisely the expected linear continuation of the progress of the echo position that occurs, and as a result of this the intended compressed presentation with the commenced track segment can be implemented. In step 809 the data of the echo to be joined is taken over as new entries into the track list 614, 615. In step 1000 the boundary straight lines 605, 606, 607, 608 of the expectation funnels still need to be updated.

To this effect in step 1002 with reference to the deposited parameters of the left funnel straight line 605 the position 616 of the left funnel rim at the point in time of the occurrence of the echoes E4 (405) and E5 (406) is calculated. If the position of the echo start 610 is greater than the position 616 of the left funnel straight line at the point in time of the echo, the parameters of the left funnel straight line are calculated anew, wherein the straight line is defined by the starting point of the current track segment and the echo start of the last-added echo. The determined parameters of the straight line are stored in the storage device. The boundary straight line 607 is updated in the same manner with the use of the echo E5 (406).

In step 1006 with reference to the deposited parameters of the right funnel straight line 606 the position 617 of the right funnel rim at the time of the occurrence of the echoes E4 (405) and E5 (406) is calculated. If the position of the echo end 611 is smaller than the position 617 of the right funnel straight line at the point in time of the echo, then the parameters of the right funnel straight line are calculated anew, wherein the straight line is defined by the starting point of the current track segment and the end of the last-added echo. The determined parameters of the straight line are stored in the storage device.

The boundary straight line 608 is updated in the same manner with the use of the echo E5 (406).

It should be mentioned that the resulting track list 618, despite the entries of further echoes, requires no more storage space than does the preceding track list 604.

Figure 7:
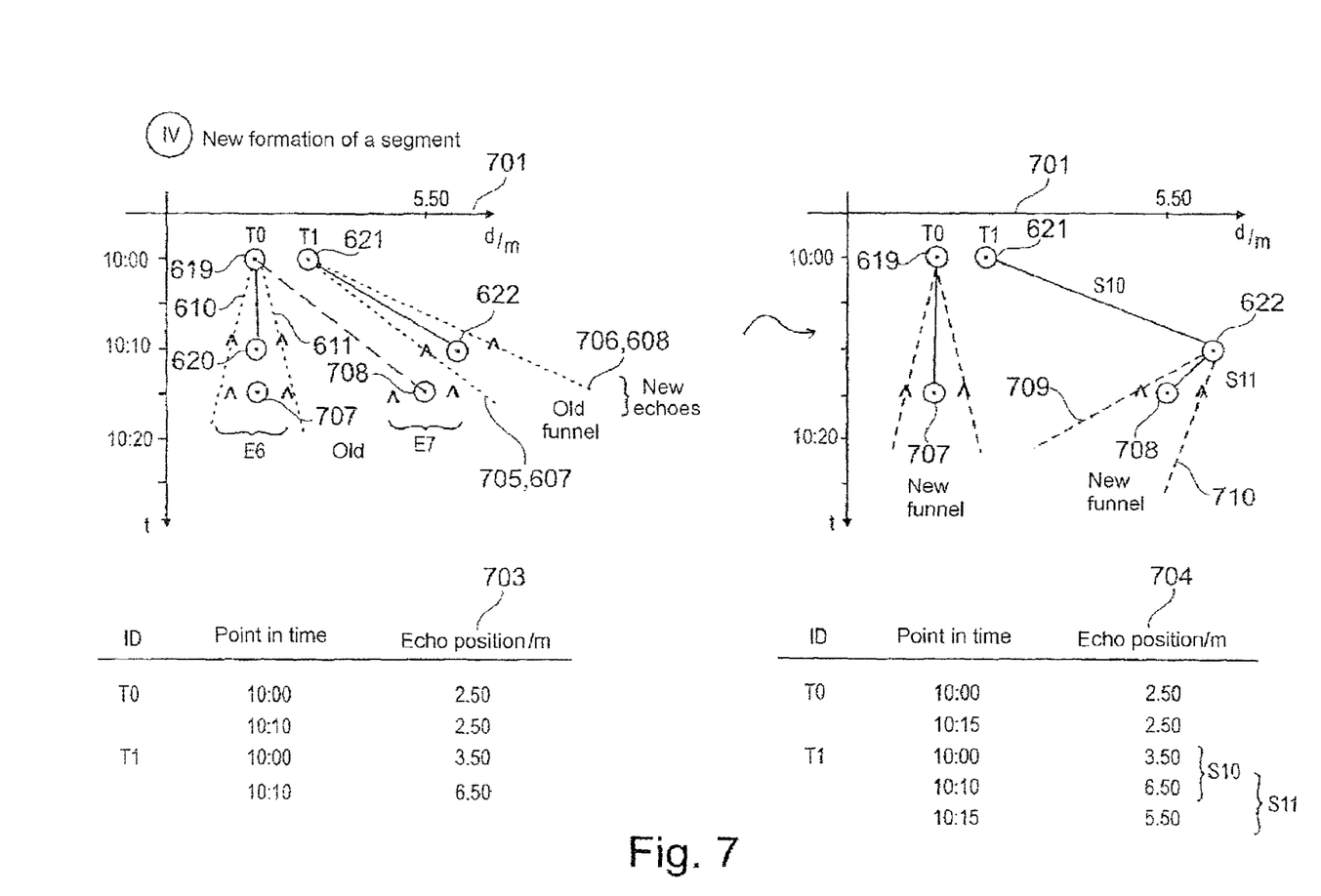
FIG. 7 shows sequences of a second part of a method according to this exemplary embodiment of the invention.

Finally, FIG. 7 illustrates the sequence of operation in those cases where linear continuation of a commenced track segment is not possible. The conditions of FIG. 6, reference character 609, or FIG. 7, reference character 701, provide the starting position. As a result of sudden filling, the filling level echo 708 (E7) takes up a position at 5.50 m. Linear continuation of the track T1 thus becomes impossible, which is graphically shown in that the position of the echo E7 is outside the boundaries of the boundary straight line 705, 706 extended to the point in time 10:15.

Figure 8:
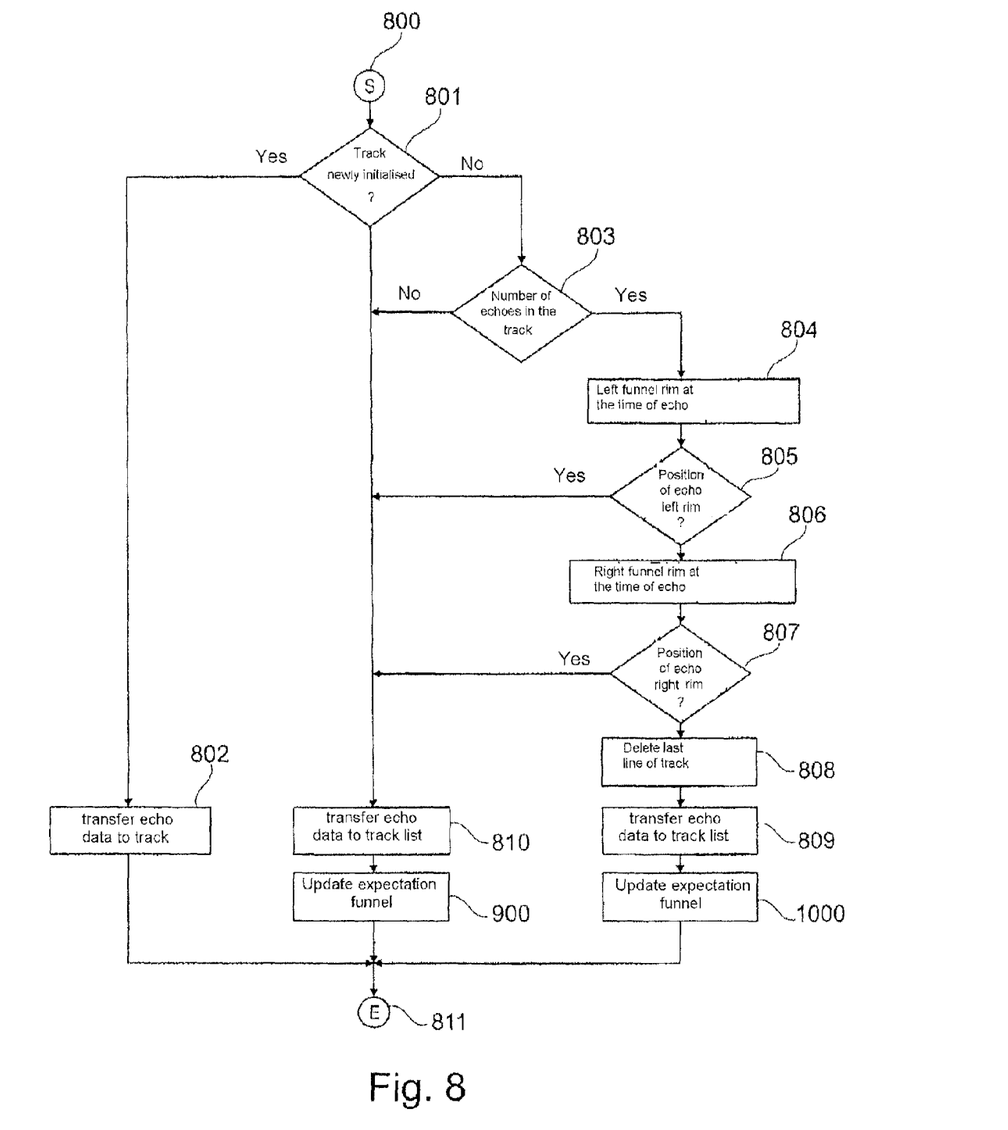
FIG. 8 shows a flow chart according to an exemplary embodiment of the invention.

Consequently, in step 805 the method according to FIG. 8 makes a transition to step 810, which immediately results in segment S10 ending in 702, and a new segment S11 with changed direction parameters and in particular with new funnel boundary straight lines 709, 710 starting. The track lists 703 and 704 show that a new track segment has been created.

In contrast to the above, the new data point 707, which is located within the T0-funnel defined by the boundary lines 610, 611, replaces the preceding data point 620.

The method may make it possible to simply present tracks within a filling-level measuring device and, apart from the very efficient presentation of spurious echoes through very long track segments, in particular also provides advantages during the periods of time in which a plant is not actively in operation, for example over the weekend. During these periods of time the stationarity characteristics of the useful echo, due to the absence of filling activities and discharging activities, also result in very efficient presentation of the arising echo data.

The method presented is based on the transfer of tracking data to a presentation with straight lines defined piece by piece. It may also be possible to use other functions, for example higher-order polynomials, in order to present the progress of the echoes in a mathematically compact manner.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An electronics module for a filling-level measuring device for segment-based signal processing, comprising:
   a storage unit storing a chronological sequence of data points that correspond to the measured values acquired by the measuring device; and
   an arithmetic unit programmed for a targeted deletion of individual data points from the storage device;
   wherein the arithmetic unit is furthermore designed for calculating a presentation of a chronological progress of the filling level on the basis of the data points that remain in the storage device after the targeted deletion and wherein after every new measuring cycle of the measuring device, a decision is made as to whether the last-stored data point is to be replaced by a new data point generated in the new measuring cycle or not.

2. The electronics module according to claim 1, wherein the presentation of the chronological progress of the filling level takes place by means of stringing together straight-line segments which are in each case characterised by way of two data points stored in the storage device.

3. The electronics module according to claim 1, wherein each data point corresponds to a measured echo.

4. The electronics module according to claim 1, wherein the chronological sequence of the data points comprises one or several tracks that are stored as track lists.

5. The electronics module according to claim 4, wherein the measuring device is a filling-level measuring device that operates according to the pulse transit-time method or the FMCW method and wherein the electronics module is designed to identify a filling level echo.

6. The electronics module according to claim 1, wherein the arithmetic unit is designed to calculate an expectation funnel of corresponding data points of the chronological sequence of data points and wherein, if a data point, which has been newly generated by a new measurement cycle, of a newly acquired echo is situated within the expectation funnel, this data point is stored and at the same time replaces an earlier data point.

7. The electronics module according to claim 1, wherein the arithmetic unit is designed to calculate an expectation funnel of corresponding data points of the chronological sequence of data points and wherein, if a data point, which has been newly generated by a new measurement cycle, of a newly acquired echo is situated outside the expectation funnel, this data point is stored, but at the same time does not replace an earlier data point.

8. The electronics module according to claim 7, wherein the arithmetic unit is designed to calculate a further expectation funnel by means of the newly generated and stored data point.

9. A measuring device for filling level measuring, comprising:
   an electronics module including (a) a storage unit storing a chronological sequence of data points that correspond to the measured values acquired by the measuring device; and (b) an arithmetic unit programmed for a targeted deletion of individual data points from the storage device,
   wherein the arithmetic unit is furthermore designed for calculating a presentation of a chronological progress of the filling level on the basis of the data points that remain in the storage device after the targeted deletion and wherein after every new measuring cycle of the measuring device, a decision is made as to whether the last-stored data point is to be replaced by a new data point generated in the new measuring cycle or not.

10. A method for segment-based signal processing in filling level measuring, comprising:
    storing a chronological sequence of data points that correspond to measured values acquired by a measuring device, wherein after each new measuring cycle of the measuring device a decision is made as to whether the last-stored data point is to be replaced by a data point generated in the new measuring cycle or not; and
    calculating a presentation of the chronological progress of the filling level on the basis of the data points remaining in the storage device after the targeted deletion.

11. The method according to claim 10, further comprising the step of:
    calculating an expectation funnel of corresponding data points of the chronological sequence of data points, wherein, if a data point, which has been newly generated by a reading, of a newly acquired echo is situated within the expectation funnel, this data point is stored and at the same time replaces an earlier data point and wherein, if a data point, which has been newly generated by a reading, of a newly acquired echo is situated outside the expectation funnel, this data point is stored, but it does not at the same time replace an earlier data point.

12. A program element embodied on a non-transitory computer-readable medium which when executed on a processor instructs the processor to carry out the following steps:
    storing a chronological sequence of data points that correspond to measured values acquired by a measuring device, wherein after each new measuring cycle of the measuring device a decision is made as to whether the last-stored data point is to be replaced by a data point generated in the new measuring cycle or not; and
    calculating a presentation of the chronological progress of a filling level on the basis of the data points remaining in the storage device after the targeted deletion.

13. A non-transitory computer-readable medium on which a program element is stored which when executed on a processor instructs the processor to carry out the following steps:
    storing a chronological sequence of data points that correspond to measured values acquired by a measuring device, wherein after each new measuring cycle of the measuring device a decision is made as to whether the last-stored data point is to be replaced by a data point generated in the new measuring cycle; and
    calculating a presentation of the chronological progress of a filling level on the basis of the data points remaining in the storage device after the targeted deletion.

* * * * *